June 14, 1966  V. P. SASOROV  3,256,383
HIGH PRESSURE GASEOUS DISCHARGE LAMP AND GAS SEAL
Filed June 7, 1963
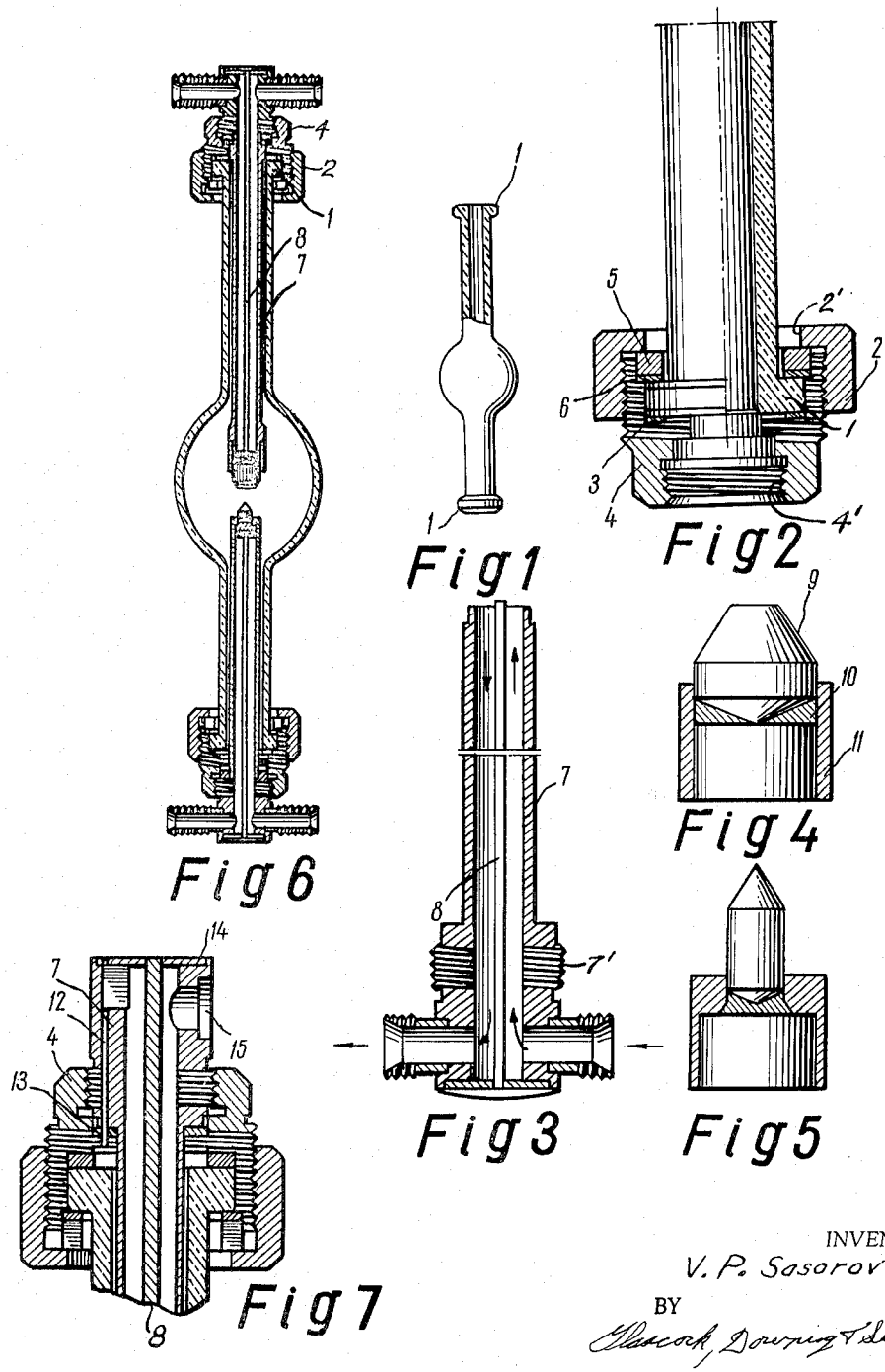
INVENTOR.
V. P. Sasorov
BY United States Patent Office 3,256,383
Patented June 14, 1966

3,256,383
HIGH PRESSURE GASEOUS DISCHARGE
LAMP AND GAS SEAL
Vasily Pavlovich Sasorov, 22/64, Apt. 8,
Moscow, U.S.S.R.
Filed June 7, 1963, Ser. No. 286,269
4 Claims. (Cl. 174—17.07)

This invention relates to large-wattage discharge lamps, and, in particular, to large-wattage, high pressure xenon lamps incorporating particular seals.

For extra high pressure xenon lamps, a definite relation exists between the lamp wattage and the dimensions of the quartz bulb, depending on the admissible maximum thermal stresses in the bulb walls. Thus, increase in lamp wattage involves a corresponding increase in bulb surface. However, increasing the bulb dimensions necessitates, in order to maintain its mechanical strength, increasing the wall thickness, and this, in its turn, involves firstly a reduction in heat conductivity through the bulb walls, an increase in the absorption of radiation by the walls, and further an increase in the operating temperature of the latter, and, secondly, an increase in the temperature gradient in the bulb walls, thus leading to a reduction of mechanical strength of the bulb.

In view of the above, an increase in xenon lamp wattage serves to reduce the operating xenon pressure and to increase the current. Xenon pressure, as is well known, affects arc brightness and lamp lumen output. As operating xenon pressure decreases, the voltage gradient also decreases, and the current must be increased to obtain the required wattage. This involves an increase in electrode losses and in quartz bulb heating. It has been found that bulb heating is dependent to a great extent on how energy is dispersed in the lamp.

Thus, an increase in extra high pressure xenon lamp wattage up to 5–15 kw. involves considerable technical difficulties as regards heating and mechanical strength of the quartz bulbs, such difficulties increasing out of proportion to the increase in wattage. In addition to the increased difficulties in designing large diameter bulbs, construction of seals and electrodes for hundreds of amperes involves further equally great difficulties.

As far as heating of extra pressure lamp quartz bulbs is concerned, intensification of bulb cooling would be of no avail, as water cooling of spherical bulbs of such lamps is not acceptable.

The principal aim of this invention is to provide a lamp capable of utilizing a practically unlimited current input, i.e. to provide a large-wattage lamp.

A further aim of the invention is to provide liquid cooling of the electrodes inside the lamp, and thus to considerably reduce the heat stresses in the bulb, resulting in a reduction of bulb and electrode dimensions.

A still further aim of the invention is to increase the mechanical strength of the bulb, and thus to permit an increase in the pressure inside the lamp resulting in an increase in brightness and lumen output.

Also an aim of this invention is to permit steamless bulb evacuation.

The basis of this invention is the assumption that the operating temperature conditions of discharge lamps and particularly of xenon lamp bulbs can be considerably alleviated not by improving the cooling of the bulbs, but rather by reducing the heating. The operating conditions of a 3 kw. extra high pressure lamp are as follows: current 100 a., lamp volts 30, out of which approximately 10 v. are electrode losses. Used in the arc proper are ⅔ of the wattage supplied to the lamp, the remainder being electrode losses. In addition, the anode is heated by heat transfer from the arc.

The bulb walls are heated by heat conductance through the gas from the high temperature arc, also by convection and radiation. As quartz is transparent to the visible and near infrared and ultraviolet regions, heating of the bulb walls due to absorption of such radiation would apparently be insignificant.

However, radiation from the glowing electrodes, and especially from the anode lies precisely in the infrared region. Therefore, bulb heating due to absorption of radiation from the glowing electrodes is significant.

Abolition or substantial weakening of such source of bulb heating would substantially reduce the bulb operating temperature and thus permit an increase in the lamp wattage.

The problem posed is solved, in accordance with this invention, by the use of a seal between the quartz and metal that permits the supply of a high current to the lamp and provides for liquid cooling of the electrodes inside the lamp. In known designs of extra high pressure xenon lamps with foil seals water cooling is impossible, while in those with graded glass seals it is also practically impossible.

Further objects and advantages of the invention will be apparent from the following description taken in conjunction with the accompanying drawing wherein:

FIG. 1 is an elevational view with parts broken away and in section and showing the glass bulb utilized in the lamp of this invention;

FIG. 2 a fragmentary longitudinal sectional view showing the details of the seal secured to a leg of the bulb;

FIG. 3 a longitudinal sectional view showing the details of the electrode holder;

FIG. 4 a sectional view showing the anode electrode;

FIG. 5 a sectional view showing the cathode electrode;

FIG. 6 a longitudinal sectional view showing the entire lamp assembly of this invention; and FIG. 7 a fragmentary longitudinal sectional view showing the details of an evacuating means for the lamp of this invention.

The legs of the quartz bulb terminate in flanges 1, as shown in FIGS. 1 and 2. The dimensions of the leg and flange may vary. To obtain a seal for practically any desired current, flange 1 is forced against the seal body 4 by pressure nut 2. A lead (or similar) gasket 3 is interposed between the flange 1 and seal body 4. As the diameter of the bore 2' in pressure nut 2 equals the diameter of flange 1, in order to exert pressure on the flange 1, half-rings 5 are inserted between the flange 1 and the nut 2. A lead gasket 6 is located between the half-rings 5 and flange 1.

The electrode holder 7 is provided with screw threads 7' to engage with the threads 4' in the seal body 4. The electrode holder 7 is hollow and can be divided inside by a partition 8 to permit water cooling of the electrode (anode or cathode). FIGS. 4 and 5 show an example of possible anode and cathode design, respectively. As shown in FIG. 4, the tungsten anode 9 is welded, by means of copper-nickel or molybdenum-nickel alloy 10, to an Armco steel connection piece 11, the latter being welded to electrode holder 7.

Evacuation of the lamp is effected through a system of holes in the metal parts secured to the leg of the bulb.

In the course of manufacture of the seal metal parts and of the electrode, a hole 12, FIG. 7, for example, 1.5 mm. dia. is drilled in the electrode holder 7 and seal body 4, the electrode holder being, for this operation, completely screwed into the seal body. With the two parts in this position, marks are made on both of the them, so that when the two marks coincide, the holes in the two parts also coincide.

In assembling the lamp, a metal (for example, lead) gasket 13 is placed between the seal body 4 and the electrode holder 7, the thickness of the gasket being, for example, 1.5 times the thread pitch, or more. When the electrode holder 7 is screwed into the seal body 4 without applying any effort, i.e., by hand, the holes 12 in the two parts will be one-half turn out of alignment. To make the two holes coincide, the electrode holder would have to be turned through one-half turn by means of a spanner; the surplus lead would then be squeezed out through the gaps between the seal and holder.

A hole is then drilled through the gasket 13, and the assembly is made vacuum tight by soldering the disc 14 in place on the end of the electrode holder. The inside space of the lamp is thus in communication with the inside space of the holder. Lamp evacuation is effected through connection 15.

To disconnect the lamp from the evacuating station, it would be sufficient to turn the electrode holder 7 through ½ turn relative to the seal.

Staggering the holes 12 through 180° and further compressing the gasket 13 through ½ thread pitch would ensure hermetic sealing. The thickness of this gasket must not be less than 1¼ thread pitch, while the staggering angle of the electrode holder relative the seal body is immaterial.

The efficacy of the invention is confirmed by the following data.

It is known that in large-wattage extra high pressure xenon lamps now available in the United States foil seals are used, while in similar lamps available in Federal Republic of Germany and in Japan graded glass seals are used. Seals of these types possess a number of essential disadvantages lowering their thermal and mechanical strength and causing breakdown of a large percentage of lamps. This requires a considerable increase in the dimensions of the lamps in order to reduce the operating pressure. However, reducing the operating pressure, as mentioned above, lowers the luminous (brightness, lumen output) and electrical (low lamp voltage, heavy currents and losses) characteristics of the lamps.

The comparative data, Table 1, of 10 kw. experimental lamps.

TABLE 1

|  | Lamp Kw. | Lamp Volts, V | Lamp Amps. I | Arc length mm. | Initial pressure cold, atm. | Brightness, kilostilbs, B | Bulb diameter, mm. D | Overall length, mm. L |
|---|---|---|---|---|---|---|---|---|
| U.S.A. | 10.0 | 40 | 250 | 8.3 | 2.5 | 145 | 100 | 7L0 |
| U.S.S.R. | 10.35 | 45 | 230 | 5.8 | 8–10 | [1] 190 | 65–70 | 275–300 |

[1] Brightness in 0.2 mm. spot diameter arc centre, not average brightness as in U.S.A. lamps.

Table 2 a comparison between 3 kw. XDA–3000 Japanese lamps and same wattage experimental lamps designed in accordance with this invention.

TABLE 2

|  | Kw. | V | I | l. | B | D | L |
|---|---|---|---|---|---|---|---|
| Japan XDA–3,000 | 3.0 | 30 | 100 | 6 | 45 | 50 | 330 |
| U.S.S.R. Д КСР–3,000 | 3.0 | 30 | 100 | 4 | 70 | 44 | 250 |

In addition to considerable improvement of lamp characteristics, rejection of the proposed design lamps due to faulty seals is a rare occurrence.

Merits of the proposed design lamps are also economy of costly materials, such as quartz, molybdenum foil or graded glass and tungsten, also simplified processing for their manufacture.

Experimental tests of the proposed design lamps show that the maximum bulb temperature is opposite the discharge and drops in the direction towards the legs. For example, in the case of a 3 kw. lamp, the temperature in the centre of the bulb does not exceed 600° C., and at the upper leg 300° C. Electrode cooling water requirement is 4 to 5 litres per minute.

Large-wattage discharge lamp seals with forced liquid cooling permit:

(1) Practically unlimited lamp current.
(2) Considerable reduction of electrode area and reduction of arc screening by the electrodes.
(3) Considerable reduction in bulb thermal stresses due to the cooling liquid carrying away the energy losses in the lamp (electrode losses), and thus a reduction in bulb diameter and lower production costs.
(4) Increase in aperture.
(5) Reduction of over all lamp dimensions.
(6) Considerable increase in lamp mechanical strength both against internal pressure and against jolts, blows and other external forces.
(7) Appreciable improvement of the lamp operational qualities, viz. increase in lamp brightness and lumen output (in comparison with similar lamps having foil or graded glass seals), increase in lamp volts, reduction in lamp current and ballast resistance losses.

The proposed lamp design renders unnecessary the provision of a bulb evacuation stem and the use of hot processes in the assembly of the lamp; it permits assembly of the lamps with a high accuracy arc gap and repeat use of many of the parts in the event of lamp failure by reason of faulty manufacture.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A high-wattage high pressure xenon lamp comprising a glass bulb having oppositely extending integral hollow legs, each leg terminating in an external flange, a metal hermetic seal for each leg, each seal comprising a body having a bore extending therethrough, a shoulder intermediate the length of said bore, a gasket engaging said shoulder, said flange being disposed in said bore in engagement with said gasket, clamping means threadedly received on said body, a second gasket engaging the opposite surface of said flange from said first gasket, means interposed between said clamping means and said second gasket, whereby upon tightening of said clamping means said body will be secured to said flange in gas-tight relationship, screw threads in said bore, an elongated hollow electrode holder extending through said bore and leg and terminating in said bulb, threads on said holder engaging the threads in said bore to secure said holder in place, an electrode secured to the end of said holder in said bulb, inlet and outlet fittings on said holder for a cooling medium, and means in said holder providing inlet and outlet flow paths for said cooling medium.

2. A high-wattage high pressure xenon lamp as defined in claim 1 in which said clamping means comprises a nut threadedly received on said body, an inwardly projecting annular flange on said nut having an opening of substantially the same diameter as said flange on said leg and in which said means interposed between said clamping means and said second gasket comprises semi-circular rings engaging the flange on said nut and said second gasket to transmit clamping pressure therebetween.

3. A high-wattage high pressure xenon lamp as defined in claim 1 in which said means in said holder providing inlet and outlet flow paths comprises a partition extending longitudinally within said holder from between said inlet and outlet fittings to a point adjacent but spaced from said electrode.

4. A high-wattage high pressure xenon lamp as defined in claim 1 in which said holder is provided with an evacuating fitting communicating with the interior, a shoulder on said holder, a second shoulder in said bore, a gasket disposed between said second shoulder and the shoulder on said holder, the wall of said holder having an axially extending passage therein terminating at one end at the shoulder on said holder and communicating at the opposite end with the interior of said holder, and said last named gasket having an aperture therein in alignment with said passage and communicting with the interior of said body and said leg to provide a continuous evacuating passage between said evacuating fitting and said bulb, whereby said bulb may be evacuated and upon partial rotation of said holder with respect to the gasket engaging said second shoulder said passage will move out of alignment with said aperture to close said passage.

References Cited by the Examiner

UNITED STATES PATENTS

| | | | |
|---|---|---|---|
| 1,981,524 | 11/1934 | Nolte | 174—15 X |
| 2,390,816 | 12/1945 | Suits | 313—184 X |
| 2,620,373 | 12/1952 | Grayson | 313—32 X |
| 3,054,921 | 9/1962 | Lye | 313—32 X |
| 3,117,213 | 1/1964 | Engstrom | 174—15 X |

ROY LAKE, *Primary Examiner.*

ROBERT SEGAL, *Examiner.*

R. P. KANANEN, *Assistant Examiner.*